(12) United States Patent
Cheng

(10) Patent No.: US 6,326,951 B1
(45) Date of Patent: *Dec. 4, 2001

(54) TRACK BALL

(75) Inventor: Vincent Cheng, Taipei Hsien (TW)

(73) Assignee: Primax Electronics, Ltd., Taipei Hsien (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,256

(22) Filed: Apr. 1, 1998

Related U.S. Application Data

(63) Continuation-in-part of application No. 08/527,768, filed on Sep. 13, 1995, now abandoned.

(51) Int. Cl.[7] ................................................ G09G 5/08
(52) U.S. Cl. ............................................. 345/167; 345/163
(58) Field of Search .................................. 345/163, 164, 345/167, 156, 157; 341/22

(56) References Cited

U.S. PATENT DOCUMENTS

| | | | |
|---|---|---|---|
| 721,462 | 2/1903 | Richards | 264/275 |
| 2,361,348 | 10/1944 | Dickson et al. | 18/30 |
| 3,098,658 | 7/1963 | Murphy | 273/230 |
| 3,177,280 | 4/1965 | Ford et al. | 264/275 |
| 3,270,108 | 8/1966 | Randolph | 264/162 |
| 4,454,253 | 6/1984 | Murphy | 521/112 |
| 4,766,194 | 8/1988 | Robertson | 528/28 |
| 5,029,292 | 7/1991 | Zajicek | 340/718 |

*Primary Examiner*—Dennis-Doon Chow
(74) *Attorney, Agent, or Firm*—Knobbe, Martens, Olson & Bear, LLP

(57) ABSTRACT

A track ball device includes a body, and a track ball mounted on said body and having an outer hollow sphere and an inner ball fitted in said outer hollow sphere. A method for manufacturing such a track ball includes the steps of a) providing an inner ball, b) providing a global mold, c) positioning the inner ball at a central portion of the global mold, and d) injecting a material into the global mold for encapsulating therein the inner ball to finally result in the track ball. Such a track ball not only avoids the conventional joint seam because the outer sphere is integrally formed, but also greatly reduces the weight because the inner ball is made of a polyurethane (PU) foam material.

8 Claims, 3 Drawing Sheets

TRACK BALL

The present invention is a continuation-in-part application of the parent application bearing Ser. No. 08/527,768 and filed on Sep. 13, 1995 abandoned.

FIELD OF THE INVENTION

The present invention is related to a track ball, and more particularly to a track ball having an inner ball fitted in an outer hollow sphere.

BACKGROUND OF THE INVENTION

A track ball device is a tool for controlling a movement of the cursor, which includes therein a global object called track ball. A general track ball has a diameter of about 1.5–2.0 cm, and is used in a personal computer for functioning like a traditional mouse device.

As for the video games, the track ball generally has a larger diameter of about 10 cm. There are two types of video game track balls, one is a hollow structure and the other is a solid structure. The hollow track ball includes two hemispherical shells which have the advantage of light weight but present therebetween an untidy joint portion due to the combination thereof. Accordingly, the solid track ball is introduced to avoid the appearance of a joint seam. But, such a prior solid track ball has a drawback that the entire solid body is made of Acrylonitrile-Butadiene-Styrene (ABS), which is relatively heavy, not effective in material, and uneasy in operation.

SUMMARY OF THE INVENTION

An object of the present invention is to provide a track ball having an inner ball which can greatly reduce the weight of the track ball because the inner ball is made of a special material.

According to the present invention, a track ball device includes a body, and a track ball mounted on the body. The track ball has an outer hollow sphere and an inner ball fitted in the outer hollow sphere.

In accordance with an aspect of the present invention, the inner ball is immovably fixed in the outer hollow sphere.

In accordance with another aspect of the present invention, the inner ball is made of a polyurethane (PU) foam material.

Preferably, the track ball has a diameter ranged from 2 to 5 inches.

In accordance with another aspect of the present invention, the method for manufacturing a track ball includes the steps of a) providing an inner ball, b) providing a global mold, c) positioning the inner ball at a central portion of the global mold, and d) injecting a material into the global mold for encapsulating therein the inner ball to finally result in the track ball. Preferably, the injected material is an unsaturated polyester.

The method further includes the steps of e) injecting a hardening agent into the global mold to harden the unsaturated polyester, and f) placing the track ball in a ball miller to be polished, lustered and finely ground.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1:
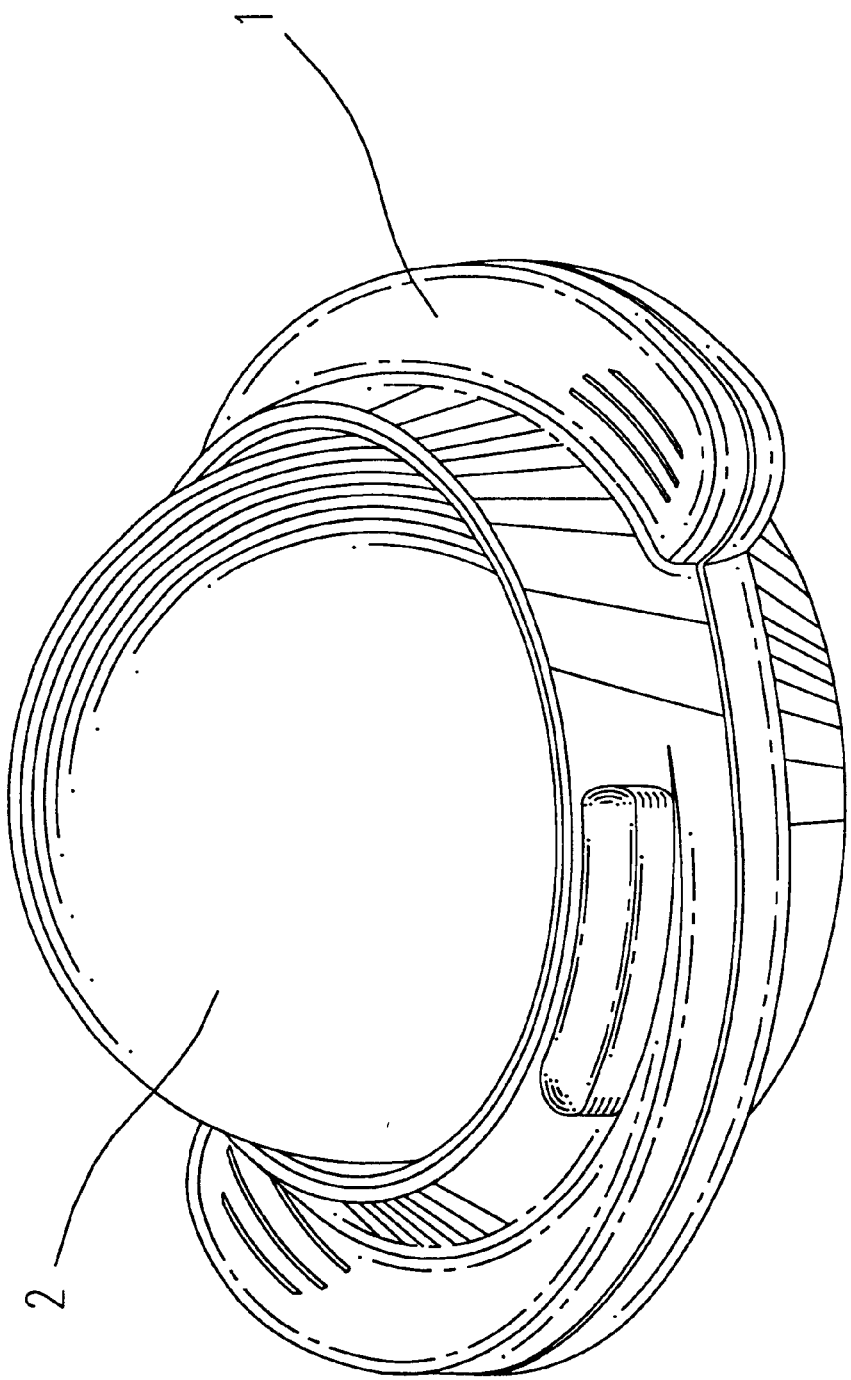
FIG. 1 is a perspective view showing a preferred embodiment of a track ball device according to the present invention.
Figure 2:
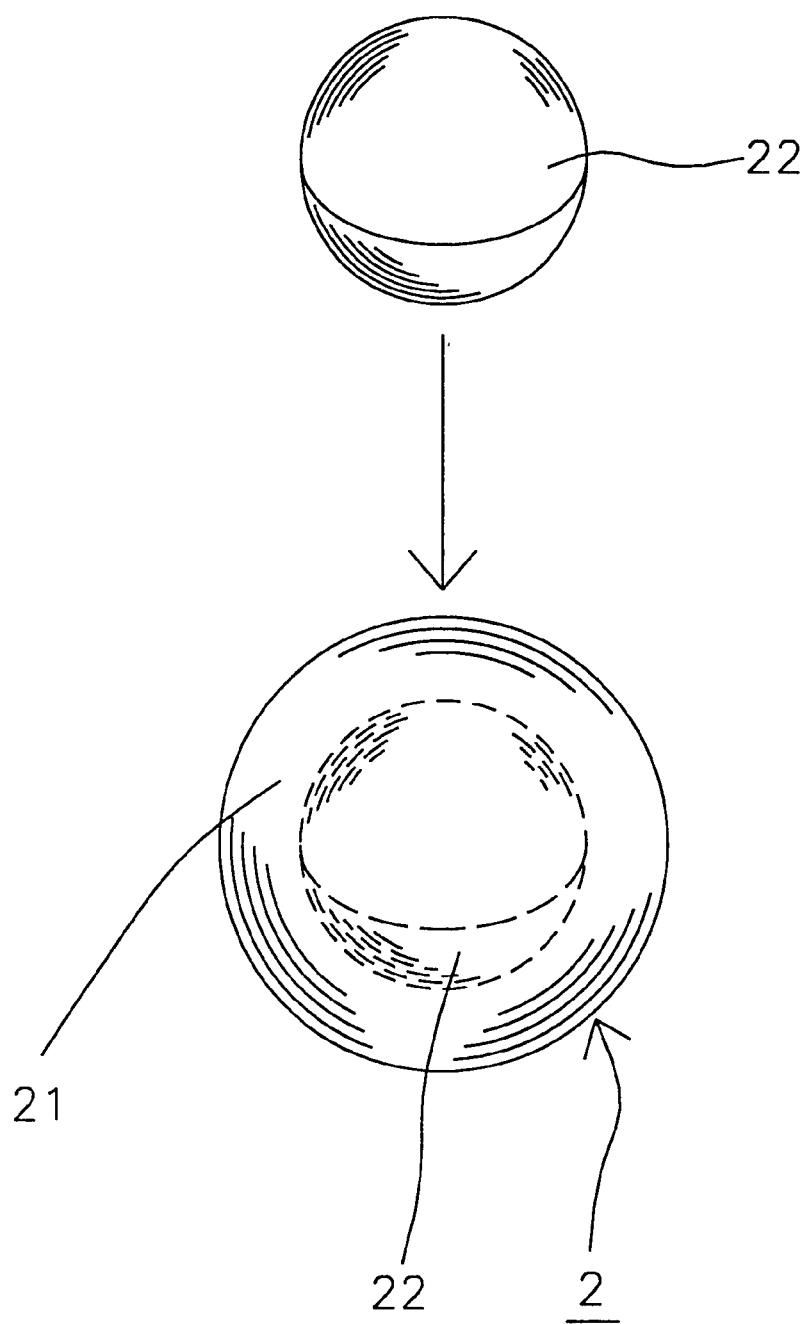
FIG. 2 is a perspective view schematically showing an inner ball and an embodiment of a track ball structure according to the present invention.

Referring to FIG. 1, a track ball device includes a body 1 and a track ball 2 mounted on the body 1 according to the present invention. The track ball device can be applied to control a movement of a cursor displayed in a personal computer, a video game, . . . and so on. Certainly, the body can be designed as another structure for other applications. Referring to FIG. 2, the present track ball 2 includes an outer hollow sphere 21, and an inner ball 22 fitted in the outer hollow sphere 21. The inner ball 22 is immovably fixed in the outer hollow sphere 21. Preferably, the outer hollow sphere 21 is made of an unsaturated polyester.

Figure 3:
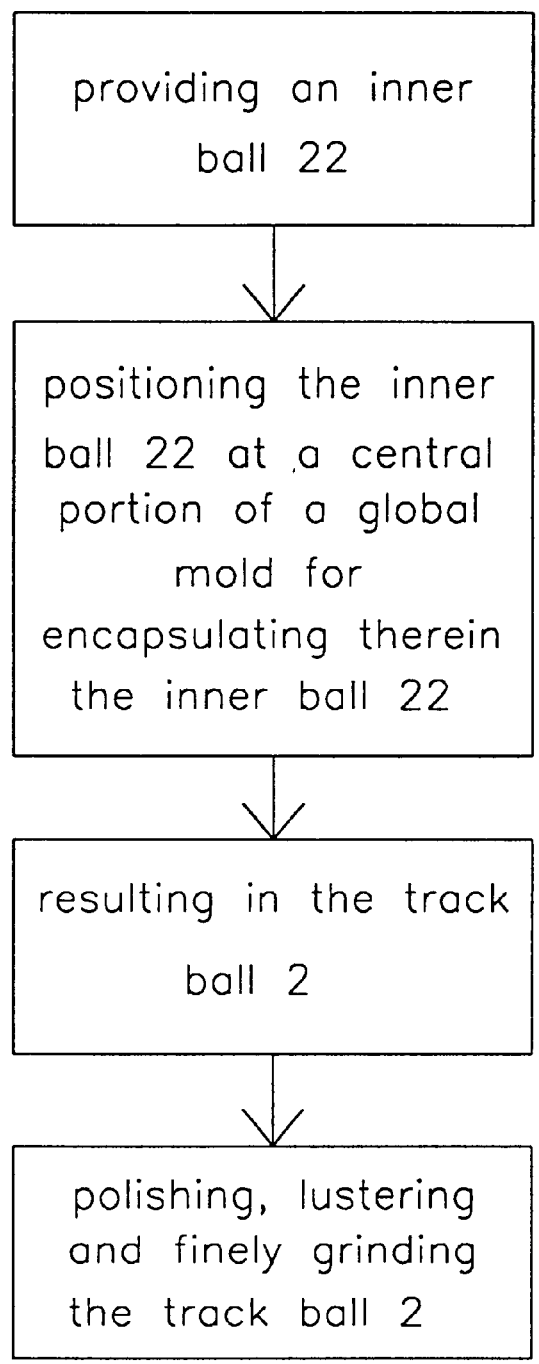
FIG. 3 is a flow chart of the steps for manufacturing the track ball according to the present invention.

A method for manufacturing the present track ball 2 includes, as shown in FIG. 3, the steps of a) providing an inner ball 22, b) providing a global mold, c) positioning the inner ball 22 at a central portion of the global mold, and d) injecting a material into the global mold for encapsulating therein the inner ball 22 to finally result in the track ball 2. The applied material can be a polymer, e.g., an unsaturated polyester.

The method further includes the steps of e) injecting a hardening agent into the global mold to harden the unsaturated polyester, and f) placing the track ball 2 in a ball miller to be polished, lustered and finely ground so as to provide the outer surface of the track ball 2 with a smooth surface. Preferably, the inner ball 22 is made of a polyurethane (PU) foam material which is lighter than those used in the prior arts. It is generally known that polyurethane (PU) foam material is less dense than the unsaturated polyester material comprising the outer hollow sphere 21. In fact, the weight of the track ball has no influence on the movement control of the cursor, but only on the touch feeling of user's hands. Preferably, the track ball has a diameter ranged from 2 to 5 inches. Certainly, the size of the track ball can be made to meet the user's requirement.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A track ball device comprising:

a body; and a track ball mounted on said body and operable by a palm of a user, wherein said track ball includes an integrally formed outer hollow sphere comprised of a first material and an inner ball fitted in said integrally formed outer hollow sphere wherein the inner ball comprises a second material, said second material is lightweight and substantially solid, and wherein a density of said second material is less than a density of said first material.

2. A track ball device according to claim 1, wherein said inner ball is immovably fixed in said outer hollow sphere.

3. A track ball device according to claim 1, wherein said inner ball is made of a polyurethane (PU) foam material.

4. A track ball device according to claim 1, wherein said track ball has a diameter ranged from 2 to 5 inches.

5. A track ball device according to claim 1, wherein said outer hollow sphere is made of a polymer.

6. A track ball device according to claim 5, wherein said outer hollow sphere is made of an unsaturated polyester.

7. A track ball device comprising:

a body; and a track ball mounted on said body and comprising an outer sphere and an inner ball, wherein said outer sphere is more dense than said inner ball wherein said inner ball is lightweight and substantially solid, and wherein said outer sphere is formed on said inner ball so that said outer sphere has a smooth surface.

8. A track ball device comprising:

a body; and a track ball mounted on said body and sized to cooperate with a palm of a user for rotating said track ball, wherein said track ball includes an integrally formed outer sphere and an inner ball comprised of a lightweight, substantially solid material, wherein said inner ball is fitted in said outer sphere, said inner ball having a density less than a density of said outer sphere.

* * * * *